United States Patent Office 3,174,826
Patented Mar. 23, 1965

3,174,826
METHOD OF TREATING ATTAPULGITE CLAY TO PRODUCE A LOW BULK DENSITY PRODUCT
Aldo P. Allegrini, Westfield, and Tom A. Cecil, Highland Park, N.J., assignors to Minerals & Chemicals Philipp Corporation, Menlo Park, N.J., a corporation of Maryland
No Drawing. Filed Oct. 4, 1962, Ser. No. 228,266
9 Claims. (Cl. 23—110)

This invention relates to a method for producing finely divided low bulk density sorbent and filter aid products from attapulgite clay and relates, especially, to a method for producing low bulk density attapulgite clay products having superior properties. In essence, this invention constitutes an improvement in the process for producing low bulk density products from attapulgite clay that is described in a copending patent application, Serial No. 38,753, filed June 27, 1960, of which I am a coinventor.

In accordance with the teachings of said copending application, low bulk density sorbent products consisting of attapulgite clay in the form of microscopically dimensioned elongated particles, are produced from attapulgite clay by dispersing the colloidal form of attapulgite clay in an aqueous solution of tetrasodium pyrophosphate (a clay dispersant or deflocculating agent) and sodium hydroxide, so as to form a thin deflocculated clay dispersion having a pH of 10 to 12. Preferably, the dispersion step is carried out at elevated temperature, below the boiling point of the dispersion. The alkaline clay dispersion is then dried quiescently—without agitation and with little if any boiling—until a mass of grindable consistency is obtained. The dried material is then ground and classified to produce an exceptionally lightweight attapulgite clay adsorbent material that can be heat activated, if desired, to enhance its usefulness as an adsorbent material. As a result of the low bulk density of these adsorbents, the unit covering power of weight efficiency of the attapulgite products is superior to that of other attapulgite clay products which have a higher bulk density. In accordance with one form of the process, the ground material obtained from the mildly dried alkaline clay dispersion is calcined at extremely high temperature for a time sufficient to dehydrate fully the clay and the dehydrated material is classified. The high temperature treatment destroys the natural adsorptive properties of attapulgite clay and results in the formation of a unique lightweight attapulgite clay product in the form of microscopic elongated or fiberlike particles which compare favorably with commercial diatomaceous earth products as a filter aid material, useful, for example, in the clarification of sugar solutions. In use as a filter aid material, the low bulk density attapulgite filter aid products made in this manner produce a bulkier, less compressible filter cake than other attapulgite clay products and, as a corollary, they permit the clarification of impure liquids to be carried out at higher filtration rates (flow rates) than would be possible with other clay products which form thin filter cakes which impede the flow of liquid through the filter screen or support.

In carrying out the process as practiced heretofore, the caustic soda was incorporated into the clay dispersion in order to permit the realization of economically feasible drying rates. The alkali functioned into two distinct manners to produce such a result. First, the presence of alkali with the dispersant afforded a means to produce deflocculated dispersions of higher clay solids contents than could be obtained in the absence of the caustic soda, provided dispersion was carried out at elevated temperature. The use of higher clay solids in the dispersions permitted a reduction in the load on the dryers in the subsequent drying step. Secondly, the presence of caustic soda in the aqueous clay dispersion permitted the drying operation to be carried out at higher temperatures than could be employed in the absence of the added caustic without adversely affecting product quality.

While the efficiency of the above-described dispersion process for producing low bulk density attapulgite clay products was improved by incorporating caustic soda into the deflocculated attapulgite clay dispersion, little, if any, product improvement accrued from the use of the added alkali. For example, the dry bulk density of the adsorbent material produced by grinding the dried attapulgite clay dispersion containing added caustic soda did not differ appreciably from the density of the material produced in the same manner but without addition of caustic soda to the clay dispersion. In effect, the end adsorbent products made with and without caustic addition in the dispersion step were comparable in quality. Similarly, the presence of a suitable quantity of alkali in the dispersion did not have a significant effect upon the filtration properties of the filter aid material obtained by high temperature dehydration of the ground dried dispersion.

Accordingly, it is an object of this invention to improve upon the properties of low bulk density attapulgite clay products obtained by a process in which a deflocculated aqueous attapulgite clay dispersion is dried quiescently and then ground.

Another object of this invention is to obtain finely divided lightweight attapulgite clay products of superior quality by a simple modification of the process that has been briefly described hereinabove.

A more specific object of this invention is to provide a means for improving upon the filtration properties, especially the filtration rate and cake permeability, of the attapulgite clay filter aid material obtained by mildly drying a deflocculated attapulgite clay dispersion.

Other objects and advantages will be readily apparent to those skilled in the art.

This invention is a result of the unexpected discovery that a marked improvement in the properties of low bulk density attapulgite clay adsorbent and filter aid products can be obtained by the above-mentioned process for producing lightweight products from coloidal attapulgite clay if the deflocculated attapulgite clay dispersion containing caustic soda is aged at a moderate temperature prior to being dried quiescently. The reason for this phenomenon is not presently understood and the result was surprising since the attapulgite clay that is employed in the process apparently does not undergo a chemical reaction with the caustic soda that is present in the clay dispersion during the aging step, as evidenced by the fact that during aging at suitable temperature levels, even for prolonged periods, the pH of the attapulgite clay dispersion containing caustic soda remains substantially unchanged.

Stated briefly, the process for producing improved finely divided lightweight clay products from attapulgite clay, in accordance with the subject invention, comprises the following steps:

(1) Colloidal attapulgite clay is dispersed in an aqueous solution, preferably a hot aqueous solution, containing tetrasodium pyrophosphate in amount sufficient to deflocculate the clay and sodium hydroxide in amount sufficient to adjust the pH of the dispersion to a value within the range of 10 to 12.

(2) The aqueous clay dispersion is aged.

(3) The aged dispersion is dried to a friable consistency by evaporating water therefrom at elevated temperature without agitating the dispersion and without permitting the dispersion to boil excessively.

(4) The dried dispersion is then pulverized and classified.

If desired, the adsorbent properties of the clay product can be enhanced by subjecting the ground clay dispersion to a heat activation step, as by calcining the ground material at a temperature within the range of about 600° F. to about 1200° F. to a volatile matter content (defined hereinafter) of about 1% to 12%.

In producing filter aid products, the process is modified by the addition of a high temperature calcination treatment of the ground dried clay dispersion. This calcination treatment is carried out at a temperature within the range of about 1650° F. to 1800° F. and for a time sufficient to eliminate all volatile matter from the clay material, following which the dehydrated clay material is classified.

When the aqueous colloidal clay dispersion containing tetrasodium pyrophosphate clay dispersant and caustic soda is aged, in accordance with this invention, the tamped dry bulk density of the adsorbent material obtained by drying and grinding the dispersion is normally from 2 to 5 pounds per cubic foot less than the 11 to 17 pounds per cubic foot density of the material that would be obtained without the dispersion aging step. In effect, a reduction of 5 pounds per cubic foot in a clay adsorbent product, such as clay floor cleaner material, means that the quantity of floor cleaner material required to cover a cubic foot of floor area is reduced by 5 pounds. While high temperature calcination of the clay adsorbent to produce a filter aid material brings about a marked increase in the dry bulk density of clay as compared with the dry bulk density of the adsorbent material from which the filter aid material is produced by high temperature calcination, nevertheless, aging of the dispersion before drying and calcination brings about a reduction in bulk density of the filter aid that can be obtained by the process. Thus, the dry bulk density of the filter aid material obtained by high temperature dehydration of the dried, ground adsorbent is normally about 13 to 20 pounds per cubic foot, which is about 2 to 5 pounds per cubic foot less than bulk density of the dehydrated material produced in the absence of aging. Aging of the slip also brings about a spectacular improvement in filter aid properties of the attapulgite clay material, especially a marked increase in flow rate and a decrease in wet filter aid cake density.

More specifically, the starting clay that is employed in carrying out the process of this invention is clay consisting chiefly of the clay mineral attapulgite and which has never been dried to a V.M. less than about 18%. The raw clay as mined (which has a V.M. of about 48% to 50% and a F.M. of about 38%) may be used although clay which has been dried somewhat, as to a V.M. of about 20% to 25%, may be used if desired. The term "V.M." as used herein refers to volatile matter which is the weight percentage of a material that is eliminated when the material is heated substantially to constant weight at 1800° F. The term "F.M." refers to free moisture which is the weight percentage of a material that is eliminated when the material is heated substantially to constant weight at about 220° F. In the case of pure clay, V.M. and F.M. are chiefly water. When attapulgite clay is dried to a V.M. less than about 18%, it undergoes irreversible impairment or loss of its native colloidal properties and is not useful in the practice of this invention. If desired, the clay may be degritted, as by wet screening, to remove grit and coarse agglomerates. A typical analysis of attapulgite clay, volatile free (V.F.) clay basis, is as follows:

| | Wt. percent |
|---|---|
| $SiO_2$ | 67.0 |
| $Al_2O_3$ | 12.5 |
| MgO | 11.0 |
| CaO | 2.5 |
| $Fe_2O_3$ | 4.0 |
| Others | 3.0 |

The micalike clays, such as kaolin clay and bentonite clay, are not useful in the practice of this invention. Attapulgite clays of different origin, and even clays from different sections of the same mine, differ somewhat in their response to the process, especially to the ultimate density and flow properties obtainable with the particular attapulgite clay.

The quantity of tetrasodium pyrophosphate (TSPP) employed in carrying out the clay dispersion step is sufficient to deflocculate completely the colloidal attapulgite clay, i.e., to produce an attapulgite clay dispersion of minimum viscosity. Preferably a slight excess of TSPP is used. The quantity of TSPP required will vary with clays of different origin and may vary with clays from different sections of the same mine. In most instances the TSPP is employed in amount within the range of 1% to 4%, based on the V.F. clay weight.

The maximum quantity of sodium hydroxide that is incorporated into the colloidal attapulgite clay dispersion is about 1%, based on the V.F. clay weight. When appreciably larger quantities of sodium hydroxide are used, such as 2% to 5% or more of the V.F. clay weight, dense final products are obtained. When the sodium hydroxide is used in amount appreciably less than 0.1% of the V.F. clay weight, the benefits of its use are not significant. The preferred quantity of sodium hydroxide is within the range of 0.25% to 0.75% of the V.F. clay weight.

In putting this invention into practice, it is preferred to dissolve the TSPP and sodium hydroxide in water and then disperse the colloidal attapulgite clay in the solution. An agitated vessel is employed in dispersing the clay since shear must be employed to effect the dispersion of attapulgite clay into its ultimate colloidally dimensioned particles. Preferably, the agitated vessel is externally heated or the solution of TSPP and sodium hydroxide that is employed in the dispersion step is heated before the clay is added thereto. Recommended temperatures for the dispersion step range from about 120° F. to about 210° F. The solution should be kept below its boiling point, although the solution can boil for short periods, such as about a minute or so, without appreciable detriment to the end sorbent or filter aid product. When carrying out the dispersion step at elevated temperature and using sodium hydroxide, the clay solids content of the dispersion will be from about 20% to about 30%. Since clays from different sources vary somewhat in their dispersion characteristics, the maximum clay solids content of the dispersion that is obtainable will vary somewhat.

When means are not avaliable for carrying out the dispersion at elevated temperature, attapulgite clay dispersions of 15% to 18% solids content may be formed by dispersing the clay in an aqeosu solution of TSPP and sodium hydroxide. In this case, the sodium hydroxide may be added to the deflocculated clay dispersion after the dispersion is produced but before the dispersion is dried.

The alkaline deflocculated clay dispersion which is obtained in carrying out this invention has a thin fluid consistency. It is essential that no coagulants be added to this slip since the desired lightweight end products will not be obtained.

The aqueous clay dispersion is then aged for at least 48 hours at a temperature above the freezing point of the dispersion and below about 100° F. Aging at normal room temperatures, especially at temperatures below 85° F., is recommended. Surprisingly, aging has a detrimental effect on product quality when it is carried out at the elevated temperatures that are preferably employed in carrying out the clay dispersion step that precedes the aging step. On the other hand, aging at a temperature that is only slightly above the freezing point of the clay dispersion will produce results that compare favorably with results obtained at high temperatures, such as temperatures in the range of 70° F. to 80° F. The temperature of the dispersion can fluctuate widely during aging, provided that it is maintained within limits above described. At aging times appreciably less than 48 hours the benifits of aging may not be sufficient to realize a significant improvement in the properties of the finished lightweight attapulgite products. There appears to be no upper limit to aging time, other than the limitation imposed by economic considerations. Normally aging times will vary within the limits of 3 to 30 days. Aging is preferably carried out without agitation although intermittent or even continuous agitation is not detrimental to product quality. Aging can be conducted in an open vessel or a closed vessel with substantially equivalent results. The clay solids content of the dispersion can be from 15% to about 30% during aging. However, when dispersions are aged at clay solids contents above 25% but below 30%, the aged dispersions must be diluted to the 25% solids level or lower before drying to obtain the benefits of the aging step. The reason for this phenomenon is not presently understood. If desired, the diluted aged dispersions can be further aged without impairing product quality.

A drum dryer may be used in drying the slip or the slip may be placed in metal or ceramic pans or trays in a thin layer, such as a layer about 1/16-inch to about 1-inch deep, and dried in an oven with a hot dry inert gas, such as air. The air temperature should be as high as possible to afford an economical, rapid drying rate but should not be so high that the slip boils since a dense product is obtained when considerable boiling occurs. The slip should not be agitated excessively when the water is being evaporated therefrom. Air temperatures as high as 575° F. have been used successfully in drying the dispersion when sodium hydroxide was incorporated in the dispersion. It will be familiar to those skilled in the art that the optimum and maximum enviornmental temperature during drying will depend on the thermal conductivity of the surface on which the dispersion is dried, upon the air velocity and humidity, etc. The drying time will vary with the drying temperature. These conditions will readily be determined experimentally for any piece of drying equipment. The slip is dried to a V.M. usually within the limits of 10% to 30%, preferably to a V.M. of 20% to 25%. Slips dried to a V.M. less than 10% produce an excess amount of fines (e.g., particles 5 microns or finer) during the subsequent grinding step whereas material having a V.M. in excess of 30% is difficult to grind with most grinding equipment. However, the V.M. of the dried slip may be as high as about 40% when grinding equipment capable of handling such moist material is available.

The dried slip is ground to at least 85% by weight minus 200 mesh and classified to remove oversized particles. In producing a filter aid, the pulverized material is calcined at 1650° F. to 1800° F. for about ½ to 4 hours. The calcined product is then mildly pulverized to break up the agglomerates that are formed during calcination and the pulverized mass classified to obtain a product that is at least 85% by weight finer than 200 mesh. A roller mill operated at slow speed is useful for the purpose.

Following are examples demonstrating the improvement in properties of attapulgite clay filter aid products that results from the addition to the process of said copending application of an aging step, in accordance with this invention.

Crude attapulgite clay was dispersed in water in which were dissolved 2.0% to 3.5% by weight of TSPP and 0.5% to 1.0% by weight NaOH, each based on the calculated volatile free clay weight. Various crude clays, designated clays "A," "B," etc., were used. The clay concentration in the dispersions were varied between 20% to 29% clay solids. To disperse the clay, the clay was agitated in the solution previously heated to 150° F. to 170° F. with a high speed mixer until clay dispersion was completed.

A sample of each freshly prepared dispersion was then dried in a tray in an oven at a temperature below 210° F. without agitating the dispersion during drying. The dried clay dispersions were pulverized to about 90% minus 200 mesh (Tyler) in a high speed hammer mill and calcined in a muffle furnace at 1680° F. to 1720° F. for 40 minutes. The calcined material was sifted over a 200 mesh (Tyler) screen to recover the 200 mesh filter aid product.

Remaining portions of each clay dispersion were allowed to age for various periods of time and temperature. Some aging was carried out in open tanks while others were carried out in closed vessels. After aging, the dispersions were dried in an oven at a mass temperature below 210° F., then pulverized to about 90% minus 200 mesh in the hammer mill, calcined in a muffle furnace at 1680° F. to 1720° F. for 40 minutes and sifted over a 200 mesh screen to recover the minus 200 mesh product.

The tamped dry bulk density of screened calcined minus 200 mesh samples was measured by the settling method described in U.S. 2,480,753 to William S. W. McCarter. In attapulgite clay filter aid products obtained by the dispersion process, there is generally a direct correlation between tamped dry bulk density and wet cake density. To evaluate the usefulness of the samples as a filter aid material, the filtration rate (flow rate) value of each sample was evaluated and compared to the flow rate of a commercial calcined diatomaceous earth filter aid material (HyFlo Supercel). Also compared were the wet bulk densities of the products, as indicated by properties of the filter cake, especially the thickness.

The results for runs made at room temperature with variation of clay solids and aging time are summarized in Table I. Results for runs made at various aging temperatures are summarized in Table II.

In the examples the flow rate testing was performed in a bomb filter test unit. The unit consisted of a vertical metal tube flanged at the bottom so that it could be bolted to a horizontal circular filter plate which supported a filter cloth and had a vertical opening through the center to permit fluid flow. A discharge valve with a threaded end was screwed to the underside of the filter plate. The filter area was 1.0 square inch. The tube assembly was enclosed in a circulating heated oil bath for temperature control.

A mixture containing 10% raw sugar and 90% refined sugar was dissolved in sufficient water to produce a 46–47° Brix solution. The filter aid was then added at a 1.33% weight dosage to the solution and the contents heated to 100° F. This slurry was then poured into the bomb filter. The bomb was capped and immediately pressurized with nitrogen to 50 p.s.i.g. before opening the flow discharge valve. The discharge valve was opened one minute after charging the solution. The filtrate volumes and corresponding time intervals were measured and recorded. The flow rate was calculated from the time required for 500 cc. of solution to flow through the filter aid.

The absolute flow rate values were converted to index values compared with the corresponding values determined by tests made on the standard diatomaceous earth filter aid product and were determined by assigning the absolute flow rate of the standard diatomaceous earth filter aid product the index value of 100.

To evaluate wet bulk density, filter cake thickness was determined by measuring the height of the air-dried filter cakes after use in filtering the sugar solution. Inasmuch as the diameter of the filter cakes obtained in the filtration test bomb were constant and equal weights of filter aid samples were used in the tests, cake thickness varied inversely with low wet bulk density. Therefore, materials which provided thicker cakes had lower wet bulk density than products which formed thinner cakes.

The results, tabulated in Tables I and II, show the following trends:

(1) The results from runs 2, 3 and 5 to 9 (Table I) show that aging the clay dispersions for at least 3 days at room temperature prior to drying decreased the tamped bulk density and increased the flow rate and cake thickness for dispersions containing 20.0% to 23.3% clay solids and 2.5% to 3.0% TSPP dispersant and 0.5% to 1.0% NaOH. Results for runs 1 and 4, made with a smaller quantity of TSPP dispersant, show that aging impaired product quality when insufficient dispersant was used.

(2) Results of runs 10 and 11 show that aging improved filter aid properties of products made up with dispersions containing high clay solids concentrations, such as 26% to 29% clay solids, provided the aged dispersions were subsequently diluted before being dried.

(3) Data in Table II for run 12 show that aging at elevated temperature, such as 160° F., had a detrimental effect on product quality whereas an aging temperature as low as 34° F. was almost as effective as aging at 70° F. to 80° F.

V.F. clay weight is the weight of the clay after the clay has been heated substantially to constant weight at 1800° F.

All dry bulk density values referred to herein refer to tamped bulk densities as measured by the settling method described in U.S. 2,480,753.

We claim:

1. A method for treating attapulgite clay to produce therefrom a low bulk density attapulgite clay product which comprises providing a colloidal aqueous dispersion of attapulgite clay containing (a) tetrasodium pyrophosphate in an amount sufficient to deflocculate said clay and (b) sodium hydroxide in amount sufficient to provide a clay dispersion having a pH of 10 to 12, aging said dispersion at ambient temperature for at least 48 hours, evaporating water from said dispersion while maintaining said dispersion quiescent until a mass of grindable consistency is obtained and grinding said mass, said aging of the clay dispersion being carried out for a time such that the tamped bulk density of the ground material is less than the tamped bulk density of the ground material that is produced when the aging step is omitted.

2. The method of claim 1 in which said dispersion is aged at a temperature below 100° F. and above the freezing point.

3. The method of claim 1 in which the ground mass is dehydrated substantially completely at a temperature within the range of about 1650° F. to about 1800° F. and then classified to recover a finely divided product that is useful as a filter aid.

4. A method for treating attapulgite clay to produce therefrom a low bulk density attapulgite clay filter aid product which comprises providing a colloidal aqueous dispersion of attapulgite clay containing (a) tetrasodium pyrophosphate in an amount sufficient to deflocculate said clay and (b) sodium hydroxide in amount sufficient to provide a clay dispersion having a pH of 10 to 12, aging said dispersion at ambient temperature for at least 48 hours, evaporating water from said dispersion while maintaining said dispersion quiescent until a mass of grindable consistency is obtained, grinding said mass and calcining the ground mass at a temperature and for a time sufficient to dehydrate said mass substantially completely,

TABLE I

*Effect of aging time prior to drying on filter aid properties of attapulgite clay products—constant aging temperature of 70–80° F.*

| Crude Clay | A | | | B | | | C | D | | | |
|---|---|---|---|---|---|---|---|---|---|---|---|
| Run No | 1 | 2 | 3 | 4 | 5 | 6 | 7 | 8 | 9 | 10 | 11 |
| Dispersion: | | | | | | | | | | | |
| Percent TSPP [1] | 2.0 | 2.5 | 3.0 | 2.0 | 2.5 | 3.0 | 3.0 | 2.5 | 2.5 | 2.5 | 2.6 |
| Percent NaOH [1] | 0.5 | 0.5 | 0.5 | 0.5 | 0.5 | 0.5 | 0.5 | 0.8 | 0.8 | 0.8 | 0.8 |
| Percent Clay solids | 20.0 | 20.0 | 20.0 | 20.0 | 20.0 | 20.0 | 20.0 | 21.0 | 23.3 | 26.0 | 29.0 |
| No Aging Before Drying: | | | | | | | | | | | |
| Tamped dry bulk density, lb./ft.³ | 19.7 | 19.9 | 19.0 | 18.8 | 19.8 | 17.6 | 16.0 | 14.6 | 15.0 | 17.4 | 15.3 |
| Filtration rate index | 90 | 91 | 95 | 93 | 90 | 134 | 77 | 88 | 124 | 124 | 103 |
| Cake thickness, 1/32″ | 21 | 21 | 21 | 23 | 21 | 24 | 25 | 25 | 24 | 24 | 26 |
| Aging at 70–80° F. Before Drying: | Closed tank aging. | | | | | | | Open tank aging. | | | |
| Days aged | 4 | 4 | 4 | 3 | 3 | 3 | 12 | 5 | 3 | 4 | 5 |
| Tamped dry bulk density, lb./ft.³ | 20.5 | 14.6 | 15.6 | 19.6 | 16.5 | 15.5 | 13.7 | 13.1 | 12.4 | 20.0 | 19.5 |
| Filtration rate index | 90 | 93 | 112 | 91 | 123 | 148 | 89 | 91 | 129 | 101 | 145 |
| Cake thickness, 1/32″ | 20 | 25 | 25 | 21 | 25 | 24 | 27 | 27 | 24 | 21 | 21 |
| Dilution Before Drying: | | | | | | | | | | | |
| Final clay solids concentration | | | | | | | | | | 21.5 | 21.5 |
| Total days aged | | | | | | | | | | 4 | 8 |
| Tamped dry bulk density, lb./ft.³ | | | | | | | | | | 13.8 | 14.2 |
| Filtration rate index | | | | | | | | | | 111 | 119 |
| Cake thickness, 1/32″ | | | | | | | | | | 26 | 26 |

[1] Based on volatile free clay weight.

TABLE II

*Effect of aging temperature on filter aid properties of attapulgite clay products*

| Crude Clay | E | E | E |
|---|---|---|---|
| Run No | 12 | 12 | 12 |
| Percent TSPP | 2.7 | 2.7 | 2.7 |
| Percent NaOH | 0.5 | 0.5 | 0.5 |
| Percent Solids | 20.0 | 20.0 | 20.0 |
| No Aging: | | | |
| Tamped dry bulk density, lb./ft.³ | 20.9 | | |
| Flow rate index | 104 | | |
| Cake thickness, 1/32″ | 18 | | |
| Aging (closed vessels): | | | |
| Aging temperature, ° F | 34 | 70–80 | 160 |
| Days aged | 4 | 4 | 4 |
| Tamped dry bulk density, lb./ft.³ | 19.9 | 20.0 | 25.7 |
| Flow rate index | 113 | 115 | 98 |
| Cake thickness, 1/32″ | 20 | 20 | 18 |

The term "clay solids content" as used herein refers to the weight percent of volatile free (V.F.) clay in a dispersion and is calculated as follows:

$$\text{Percent clay solids} = \frac{\text{V.F. clay weight}}{\text{Wt. of water plus V.F. clay weight}}$$

said aging of the clay dispersion being carried out for a time such that the thickness of a filter cake of the calcined ground material that is produced when said calcined ground material is incorporated into an impure aqueous sugar solution and the solution filtered under a pressure of 50 p.s.i.g. exceeds the thickness of a filter cake of the same diameter that is obtained using as the filter aid the same weight of calcined ground material that is obtained when the aging step is omitted.

5. A method for treating clay to produce a low bulk density clay product therefrom which comprises providing a colloidal aqueous dispersion of attapulgite clay containing (a) tetrasodium pyrophosphate in amount sufficient to deflocculate said clay and (b) sodium hydroxide in amount sufficient to provide a clay dispersion having pH of 10 to 12, said clay dispersion having a clay solids content within the range of about 20% to 25%, aging said dispersion for at least 48 hours at a temperature above the freezing point and below 100° F., evaporating water from the aged dispersion while maintaining said dispersion quiescent until a mass of grindable consistency is obtained, and grinding said mass, said aging of the clay dispersion being carried out for a time such that the tamped bulk density of the ground material is less than the tamped bulk density of the ground material that is produced when the aging step is omitted.

6. The method of claim 5 in which the ground mass is then calcined at a temperature of about 1650° F. to about 1800 F. for a time sufficient to reduce the volatile matter content thereof to about zero and classified to recover a finely divided filter aid product.

7. A method for treating attapulgite clay to produce a filter aid material which comprises forming an aqueous solution of tetrasodium pyrophosphate and sodium hydroxide, dispersing colloidal attapulgite clay in said solution in amount such as to form a dispersion having a clay solids content in excess of 25% while maintaining the temperature of said solution within the range of about 120° F. to about 210° F. while said clay is being dispersed therein, said tetrasodium pyrophosphate being present in said solution in amount sufficient to deflocculate said clay in said solution when dispersed therein and said sodium hydroxide being present in amount sufficient to form a disperison having a pH within the range of 10 to 12, aging said clay dispersion at ambient temperature for at least 48 hours, adjusting the clay solids content of the aged dispersion to a value within the range of 20% to 25% by addition of water, evaporating the water from the aged dispersion while maintaining said dispersion quiescent until a mass of grindable consistency is obtained, grinding said mass, and dehydrating the ground mass, said aging of the clay dispersion being carried out for a time such that the thickness of a filter cake of the calcined ground material is incorporated into an impure aqueous sugar solution and the solution filtered under a pressure of 50 p.s.i.g. exceeds the thickness of a filter cake of the same diameter that is obtained using as the filter aid the same weight of calcined ground material that is produced when the aging step is omitted.

8. A method for treating attapulgite clay to produce therefrom a low bulk density attapulgite clay product which comprises providing a colloidal aqueous dispersion of attapulgite clay containing (a) tetrasodium pyrophosphate in an amount sufficient to deflocculate said clay and (b) sodium hydroxide in amount sufficient to provide a clay dispersion having a pH of 10 to 12, aging said clay dispersion without agitation at a temperature above the freezing point and below 100° F. for a time within the range of 3 to 30 days, evaporating water from the aged dispersion while maintaining said dispersion quiescent until a mass of grindable consistency is obtained and grinding said mass.

9. The method of claim 8 in which the ground mass is calcined at a temperature within the range of 1650° F. to 1800° F. for a time sufficient to reduce the volatile mater to about zero and the calcined material classified to recover finely divided product useful as a filter aid.

References Cited in the file of this patent
UNITED STATES PATENTS

| | | |
|---|---|---|
| 1,790,272 | Leasman | Jan. 27, 1931 |
| 3,049,449 | Allegrini | Aug. 14, 1962 |
| 3,050,863 | Allegrini et al. | Aug. 28, 1962 |
| 3,080,214 | Duke et al. | Mar. 5, 1963 |

OTHER REFERENCES

Searle: "The Chemistry and Physics of Clays," 2nd edition, 1933, pages 315–317.

UNITED STATES PATENT OFFICE
CERTIFICATE OF CORRECTION

Patent No. 3,174,826                      March 23, 1965

Aldo P. Allegrini et al.

It is hereby certified that error appears in the above numbered patent requiring correction and that the said Letters Patent should read as corrected below.

Column 2, line 39, for "unexepected" read -- unexpected --; line 43, for "coloidal" read -- colloidal --; column 4, line 53, for "aqueosu" read -- aqueous --; columns 7 and 8, TABLE I, Run No. 5, line 10 thereof, for "123" read -- 112 --.

Signed and sealed this 3rd day of August 1965.

(SEAL)
Attest:

ERNEST W. SWIDER
Attesting Officer

EDWARD J. BRENNER
Commissioner of Patents